(12) United States Patent
Takamura et al.

(10) Patent No.: US 9,294,360 B2
(45) Date of Patent: Mar. 22, 2016

(54) OPERATION CONTROLLING METHOD, NON-TRANSITORY COMPUTER-READABLE STORAGE MEDIUM AND OPERATION CONTROLLING APPARATUS

(71) Applicant: KONICA MINOLTA, INC., Tokyo (JP)

(72) Inventors: Shunsuke Takamura, Tokyo (JP); Shinya Ogino, Tokyo (JP); Ikuko Kanazawa, Tokyo (JP); Toshihiro Motoi, Tokyo (JP); Yoichi Kawabuchi, Hyogo (JP); Noriko Hoshino, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 242 days.

(21) Appl. No.: 14/024,224

(22) Filed: Sep. 11, 2013

(65) Prior Publication Data
US 2014/0075323 A1 Mar. 13, 2014

(30) Foreign Application Priority Data
Sep. 13, 2012 (JP) .................................. 2012-201188

(51) Int. Cl.
G06F 3/048 (2013.01)
H04L 12/24 (2006.01)
G06Q 10/10 (2012.01)

(52) U.S. Cl.
CPC .............. *H04L 41/22* (2013.01); *G06Q 10/101* (2013.01)

(58) Field of Classification Search
CPC .............................. G06Q 10/103; G06F 17/21
USPC .................................. 715/229, 255, 724, 736
See application file for complete search history.

(56) References Cited

U.S. PATENT DOCUMENTS 7,769,727 B2 * 8/2010 Sivapragasam et al. ....... 707/690
2001/0016857 A1 * 8/2001 Sorihashi ....................... 707/511
(Continued)

FOREIGN PATENT DOCUMENTS

JP 2009-151449 7/2009
JP 2010-097324 A 4/2010

OTHER PUBLICATIONS

Office Action (Notification of Reasons for Refusal) issued on Oct. 31, 2014, by the Japan Patent Office in corresponding Japanese Patent Application No. 2012-201188, and an English Translation of the Office Action. (8 pages)

*Primary Examiner* — Matthew Ell
(74) *Attorney, Agent, or Firm* — Buchanan Ingersoll & Rooney PC

(57) ABSTRACT

An operation controlling method, a non-transitory computer-readable storage medium and an operation controlling apparatus are provided for controlling operations performed on a common working area in a system, wherein the system includes one or more display sections being configured to display the common working area so as to allow plural operators to perform operations on the common working area. The method includes: determining an operator who has performed an operation on the common working area; storing an operation history in a storage section with the operation and the operator; accepting one or more designated operators, before performing an editing operation using one or more operation histories; and performing the editing operation using one or more operation histories, where the one or more operation histories are obtained by extracting one or more operation histories being associated with the one or more designated operators from operation histories in the storage section.

26 Claims, 7 Drawing Sheets

| OPERATION HISTORY NO. | OPERATOR ID | OBJECT ID | OPERATING CONTENTS | VALIDITY OF OPERATION | VALIDITY OF OBJECT |
|---|---|---|---|---|---|
| 1 | A | 1 | CREATION (10, 10) | 1 | 1 |
| 2 | B | 2 | CREATION (100, 0) | 1 | 1 |
| 3 | C | 3 | CREATION (100, 100) | 1 | 1 |
| 4 | D | 1 | MOVEMENT (100, 0) | 1 | 1 |

(56) References Cited

U.S. PATENT DOCUMENTS

| | | | |
|---|---|---|---|
| 2007/0260996 A1* | 11/2007 | Jakobson | 715/781 |
| 2008/0072209 A1* | 3/2008 | Farrah et al. | 717/113 |
| 2012/0272153 A1* | 10/2012 | Grossman et al. | 715/720 |
| 2013/0179799 A1* | 7/2013 | Savage | 715/751 |
| 2013/0326323 A1* | 12/2013 | Siwoff et al. | 715/229 |
| 2014/0068545 A1* | 3/2014 | Lehmann et al. | 717/101 |

* cited by examiner

| OPERATION HISTORY NO. | OPERATOR ID | OBJECT ID | OPERATING CONTENTS | VALIDITY OF OPERATION | VALIDITY OF OBJECT |
|---|---|---|---|---|---|
| 1 | A | 1 | CREATION (10, 10) | 1 | 1 |
| 2 | B | 2 | CREATION (100, 0) | 1 | 1 |
| 3 | C | 3 | CREATION (100, 100) | 1 | 1 |
| 4 | D | 1 | MOVEMENT (100, 0) | 1 | 1 |

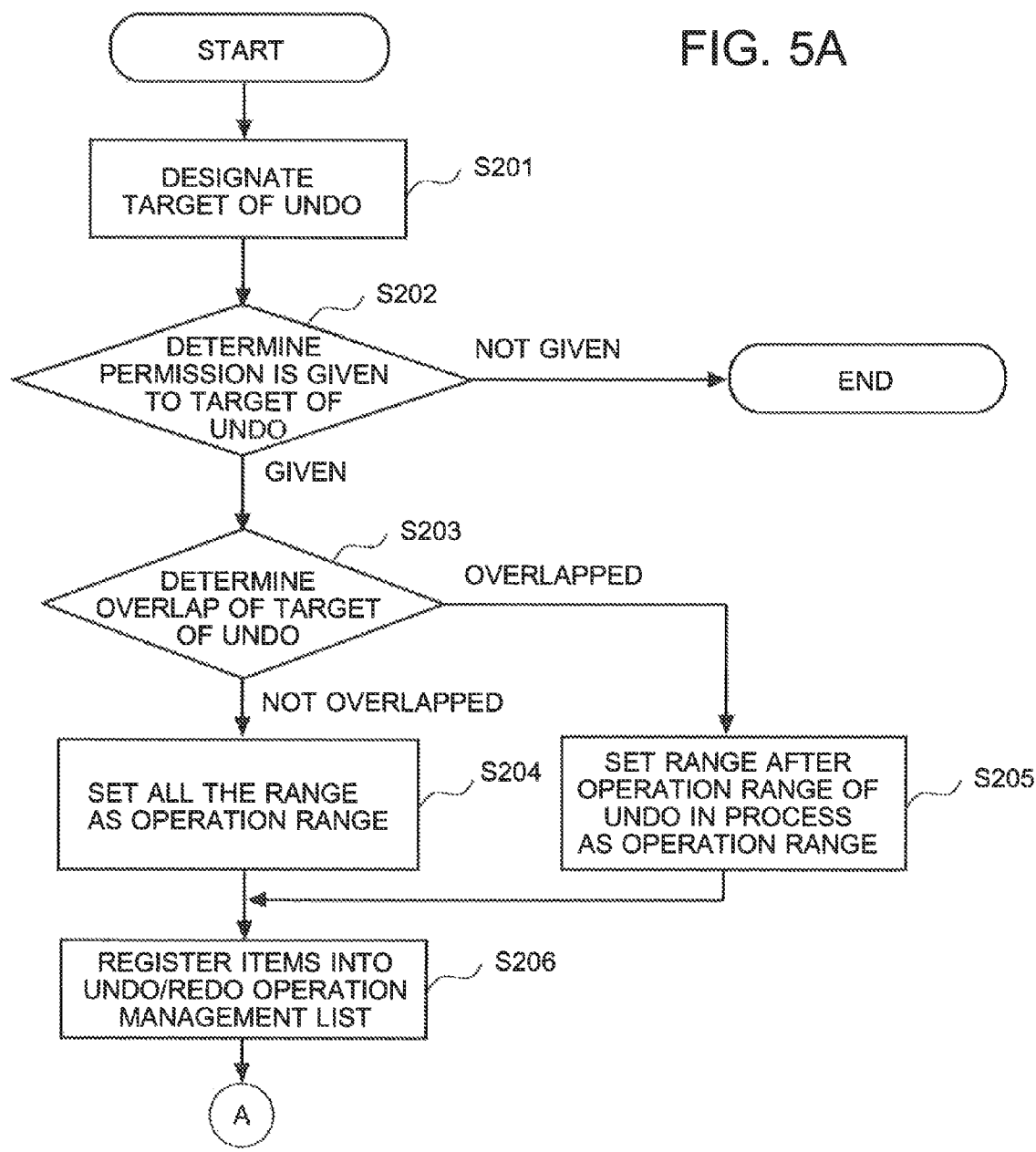

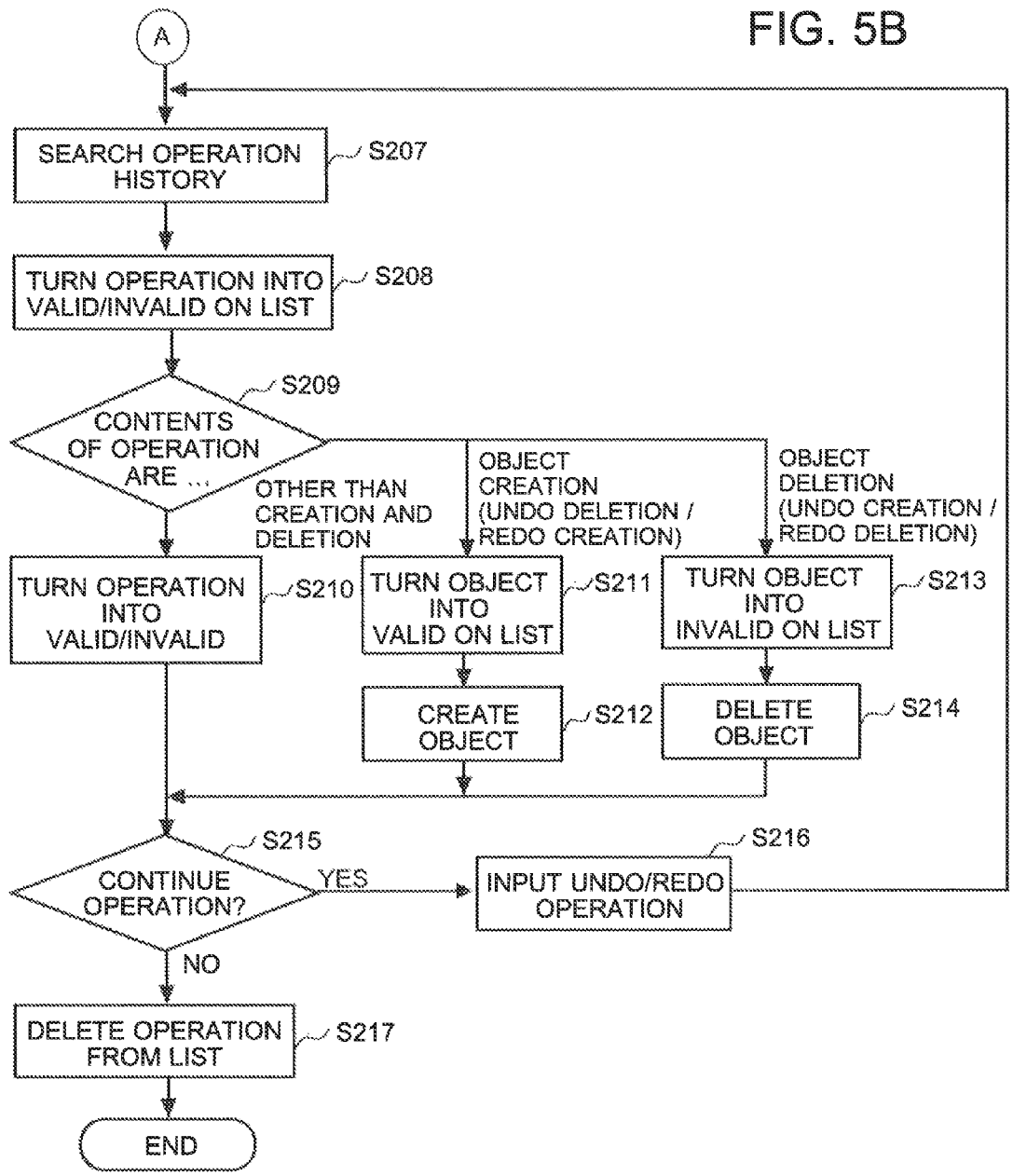

FIG. 8A
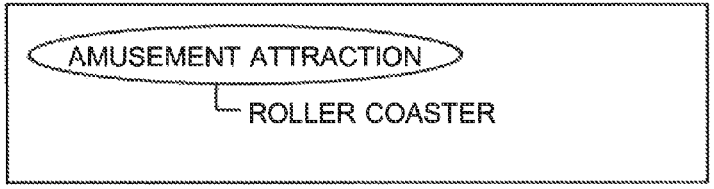
FIG. 8B
| OPERATION HISTORY NO. | OPERATOR ID | OBJECT ID | OPERATING CONTENTS | VALIDITY OF OPERATION | VALIDITY OF OBJECT |
|---|---|---|---|---|---|
| 1 | A | 1 | CREATION(10,10) | 1 | 1 |
| 2 | A | 2 | CREATION(30,20) | 1 | 1 |
|  |  |  |  |  |  |
FIG. 8C
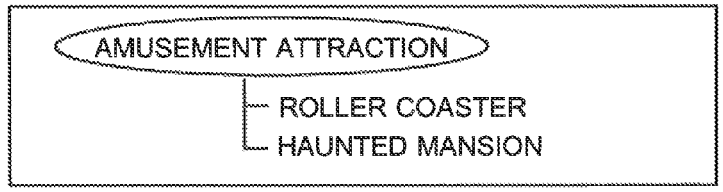
FIG. 8D
| OPERATION HISTORY NO. | OPERATOR ID | OBJECT ID | OPERATING CONTENTS | VALIDITY OF OPERATION | VALIDITY OF OBJECT |
|---|---|---|---|---|---|
| 1 | A | 1 | CREATION(10,10) | 1 | 1 |
| 2 | A | 2 | CREATION(30,20) | 1 | 1 |
| 3 | B | 3 | CREATION(30,40) | 1 | 1 |
|  |  |  |  |  |  |
FIG. 8E
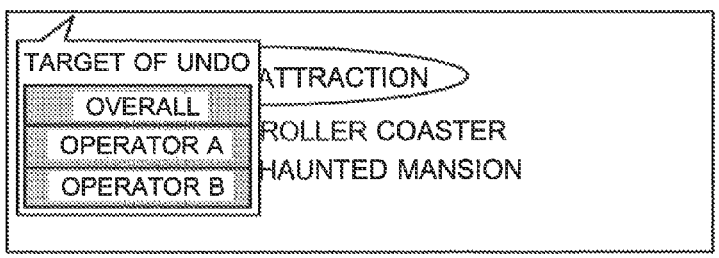

FIG. 8F

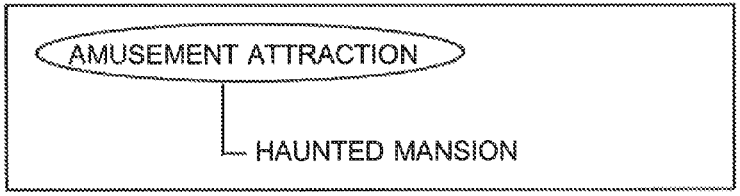

FIG. 8G

| OPERATOR ID | OPERATION TARGET | OPERATION RANGE |
|---|---|---|
| A | A | 1, 3 |
|  |  |  |

FIG. 8H

| OPERATION HISTORY NO. | OPERATOR ID | OBJECT ID | OPERATING CONTENTS | VALIDITY OF OPERATION | VALIDITY OF OBJECT |
|---|---|---|---|---|---|
| 1 | A | 1 | CREATION(10,10) | 1 | 1 |
| 2 | A | 2 | CREATION(30,20) | 0 | 0 |
| 3 | B | 3 | CREATION(30,40) | 1 | 1 |

FIG. 8I

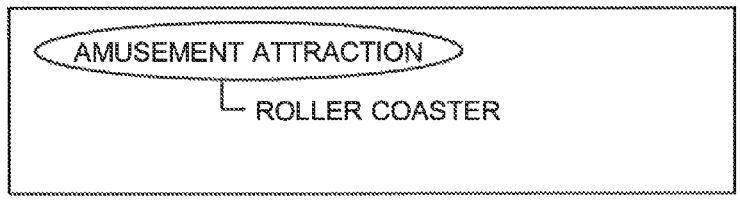

FIG. 8J

| OPERATOR ID | OPERATION TARGET | OPERATION RANGE |
|---|---|---|
| A | A, B | 1, 3 |
|  |  |  |

FIG. 8K

| OPERATION HISTORY NO. | OPERATOR ID | OBJECT ID | OPERATING CONTENTS | VALIDITY OF OPERATION | VALIDITY OF OBJECT |
|---|---|---|---|---|---|
| 1 | A | 1 | CREATION(10,10) | 1 | 1 |
| 2 | A | 2 | CREATION(30,20) | 1 | 1 |
| 3 | B | 3 | CREATION(30,40) | 0 | 0 | ic
OPERATION CONTROLLING METHOD, NON-TRANSITORY COMPUTER-READABLE STORAGE MEDIUM AND OPERATION CONTROLLING APPARATUS

This application is based on Japanese Patent Application No 2012-201188 filed on Sep. 13, 2012, in the Japan Patent Office, the entire content of which is hereby incorporated by reference.

TECHNICAL FIELD

The present invention relates to an operation controlling method, a non-transitory computer-readable storing medium storing an operation controlling program, and an operation controlling apparatus. The present invention specifically relates to such an operation controlling method, a non-transitory computer-readable storing medium storing instructions for controlling operations, and an operation controlling apparatus, each of which is to he implemented, executed or included in such a system that is provided with a common working area in which a plurality of persons performs operations in a cooperative manner.

BACKGROUND

On a computer apparatus, it is possible for users to perform an editing operation using an operating history, such as an operation to cancel a last operation so as to resume an original operation (hereinafter, called an "Undo") and an operation to perform the canceled operation over again (hereinafter, called a "Redo"). Further, owing to the fact that a method for sequentially canceling previous operations one by one makes it difficult to efficiently perform the editing operation, proposed is such anther method that makes it possible to group a plurality of operating histories into a single group, so as to cancel the operations in a unit of the group.

For instance, Japanese Patent Application Laid-Open Publication (JPA) No 2009-151449 discloses an electronic blackboard having an "Undo" function. The electronic blackboard is provided with an inputting section that accepts various kinds of inputting and instructing operations, which are performed by handwriting characters and figures; a display section that displays the characters and figures above-inputted thereon, corresponding to the inputted positions of the characters and figures; a history data storage section that stores the characters and figures above-inputted as a history for every scratch of the pen, therein; a determining section that determines a processing to be implemented, based on the operations accepted; a grouping processing section that performs a processing for determining a group constituted by plural histories in regard to more than one scratch of the pen; a selecting section that responds to a predetermined operation so as to select any one of the groups above-determined; and an "Undo" processing section that follows the histories in regard to the characters and figures, which are displayed on the display section, in the reverse sequence, so as to resume the state before performing the inputting operation, wherein the "Undo" processing section follows the histories in regard to only the group, selected by the selecting section, in a reverse sequence, so as to resume the display status before performing the inputting operation in regard to the group concerned.

As above-mentioned, in such a case that a single user operates a terminal device, it is possible for the user to conduct editing operations by cancelling the last operation, performing the cancelled operation over again, and cancelling the operations in a unit of a group, and so on, so as to realize the editing status desired by the user concerned.

In recent years, employed is an electronic conferencing system in which a plurality of terminal devices are coupled to each other so as to reflect operations performed on a screen of each terminal device onto another screen of the other terminal device, and a plurality of users performs operations onto a screen of a single terminal device so as to make discussions between them. In such the electronic conferencing system having the common working area in which a plurality of users commonly performs operations, sometimes, there arises such a need for editing only the operations performed by the specific user.

However, in such a case that the operations performed by a plurality of users are mingled with each other, the conventional method for sequentially undoing or redoing the operations one by one cannot make it possible to edit only the operations performed by the specific user. Further, according to the method disclosed in JP-A No. 2009-151449 aforementioned, since all of the operations included in the group are to be cancelled, operations performed by the other users are also cancelled at a time, when the operations performed by the other users are mingled within the same group. The present invention seeks to solve the problem.

SUMMARY

There are disclosed illustrative image processing apparatuses and image processing methods.

An illustrative operation controlling method reflecting one aspect of the present invention is a method of controlling operations performed on a common working area in a system, where the system comprises one or more display sections being configured to display the common working area so as to allow a plurality of operators to perform operations on the common working area. The method comprises: determining an operator in response to an operation performed by the operator on the common working area displayed in the one or more display sections; and storing an operation history in a storage section with the operation and the operator being associated with the operation history. The method further comprises: accepting one or more designated operators to be used for searching a desired operation history from among operation histories in the storage section, before performing an editing operation using the desired operation history; and performing the editing operation using one or more extracted operation histories as the desired operation history, where the one or more extracted operation histories are obtained by extracting one or more operation histories being associated with the one or more designated operators from among the operation histories in the storage section.

An illustrative non-transitory computer-readable storing medium reflecting one aspect of the present invention is a non-transitory computer-readable storage medium storing instructions for controlling operations performed on a common working area in a system, where the system comprises one or more display sections being configured to display the common working area so as to allow a plurality of operators to perform operations on the common working area. The instructions, when executed by a processor in the system, causes the processor to perform processes including: determining an operator in response to an operation performed by the operator on the common working area displayed in the one or more display sections; and storing an operation history in a storage section with the operation and the operator being associated with the operation history. The processes further includes: accepting one or more designated operators to be used for searching a desired operation history from among operation histories in the storage section, before performing an editing operation using the desired operation history; and performing the editing operation using one or more extracted operation histories as the desired operation history, where the one or more extracted operation histories are obtained by extracting one or more operation histories being associated with the one or more designated operators from among the operation histories in the storage section.

An illustrative operation controlling apparatus reflecting one aspect of the present invention is an operation controlling apparatus for controlling operations performed on a common working area in a system, where the system comprises one or more display sections being configured to display the common working area so as to allow a plurality of operators to perform operations on the common working area. The operation controlling apparatus comprises: a storage section for storing operation histories; an operating section configured to allow the operators to perform operations on the common working area; and an operator determining section configured to determine an operator in response to an operation performed by the operator on the common working area displayed in the one or more display sections. The operation controlling apparatus further comprises a processing section configured to store an operation history in a storage section with the operation and the operator being associated with the operation history, accept one or more designated operators to be used for searching a desired operation history from among operation histories in the storage section, before performing an editing operation using the desired operation history, and perform the editing operation using one or more extracted operation histories as the desired operation history, where the one or more extracted operation histories are obtained by extracting one or more operation histories being associated with the one or more designated operators from among the operation histories in the storage section.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 4 is a table showing an example of an Undo/Redo operation management list in accordance with an embodiment of the present invention;

FIGS. 5A and 5B are flowcharts showing a flow of processing to be conducted by a common terminal device in accordance with an embodiment of the present invention, when an Undo/Redo operation is performed;

FIG. 6 is a table showing an example of a repeating operation management list in accordance with an embodiment of the present invention;

FIGS. 8A and 8B are diagrams showing a concrete example of an operation (operation to create an object) to be conducted by a common terminal device in accordance with an embodiment of the present invention;

FIGS. 8C and 8D are diagrams showing a concrete example of an operation (operation to add an object) to be conducted by a common terminal device in accordance with an embodiment of the present invention;

FIG. 8E is a schematic diagram showing a concrete example of an operation (operation to designate an operator) to be conducted by a common terminal device in accordance with an embodiment of the present invention;

FIGS. 8F to 8H are diagrams showing a concrete example of an operation (editing operation in regard to an individual operator) to be conducted by a common terminal device in accordance with an embodiment of the present invention; and FIGS. 8I to 8K are diagrams showing a concrete example of an operation (editing operation in regard to overall operators) to be conducted by a common terminal device in accordance with an embodiment of the present invention.

DETAILED DESCRIPTION

Figures 1, 2:
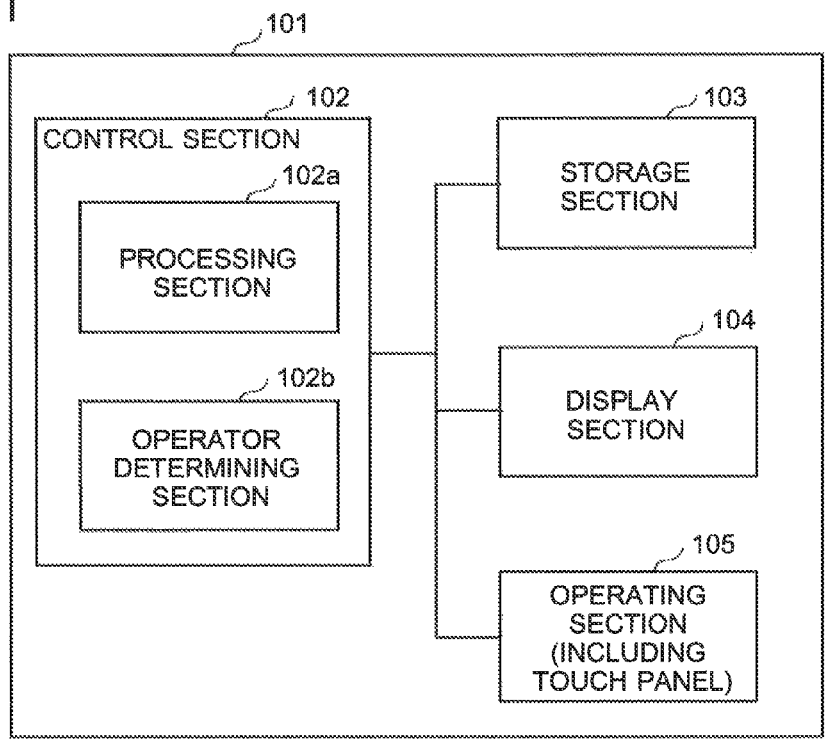
FIG. 1 is a block diagram showing a configuration of a common terminal device in accordance with an embodiment of the present invention.
FIG. 2 is a table showing an example of an operation history management list in accordance with an embodiment of the present invention.

Illustrative embodiments of operation controlling methods, non-transitory computer-readable storage medium each storing instructions for controlling operations and operation controlling apparatuses will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to operation controlling methods, non-transitory computer-readable storage medium each storing instructions for controlling operations and operation controlling apparatuses as embodiments of the present invention, even in such a system that is provided with a common working area in which a plurality of users commonly performs operations, it becomes possible not only to perform editing operations for every user, but also to bring the common working area into an editing condition desirable for every user.

This is because, for example, the operation controlling apparatus, provided in the system having the common working area being operable of a plurality of users, conducts the following control controlling operations. The control operations includes: in response to an operation performed by an operator on the common working area, determining the operator; storing an operation history in the storage section with the operation and the operator being associated with the operation history; accepting one or more designated operators to be used for searching a desired operation history from among the operation histories in the storage section, before performing an edit operation using the desired operation history, such as cancelling an operation (Undo), doing an operation over again (Redo) and repeating an operation (Repetition); extracting an operation history stored with being associated with the one or more designated operators from among the operation histories in the storage section; and performing the edit operation using the extracted operation history.

As illustrated in the description about the background, although editing operations using the operation histories, such as an "Undo" operation for cancelling a last operation, a "Redo" operation for resuming a cancelled operation, etc., have been performed so far, in an electronic conferencing system where a plurality of users conducts various kinds of operations, when the operations conducted by the plurality of users are mingled with each other, it is impossible to edit only operations conducted by the specific user. Further, even in a case that the operations are to be grouped, when the operations, conducted by the plural users, are mingled with each other within a same group, it is also impossible to edit only operations conducted by the specific user, since operations conducted by the other users are edited as well.

To overcome the above-mentioned problem, according to an embodiment of the present invention, in a system comprising one or more display sections being configured to display a common working area so as to allow a plurality of operators to perform operations on the common working area, the following control processes are performed. When an operation is performed on the common working area, a processor in the system determines the operator and stores an operation history in the storage section with the operation and the operator being associated with the operation history. When an operator performs an editing operation using an operation history on the common working area, the processor accepts one or more designated operators to be used for searching a desired operation history from among operation histories in the storage section, extracts one or more operation histories being associated with the one or more designated operators from among the operation histories in the storage section so as to as to make it possible for every operator to perform various kinds of editing operations, such as an "Undo" of an operation which has ever been performed, a "Redo" of an operation which has been undone, and a repetition of an operation which has ever been performed. Further, the processor in the system may store an object to be a target of the operation into the storage section additionally to the operation and the operator, so as to, when an editing operation to create or delete an object is performed, set predetermined operation histories being associated with the object to be valid or invalid.

According to the above-mentioned feature, even if how much editing places are complicated, it is possible to edit only the operations of the specific user, and it becomes possible to easily make an editing state desired by the user.

EXAMPLES

In order to further describe the preferred embodiment of the present invention in detail, referring to FIG. 1 through FIG. 8K, an operation controlling method, a non-transitory computer-readable storage medium storing instructions for controlling operations performed on a common working area in a system and an operation controlling apparatus, embodied in the present invention, will be detailed in the following. FIG. 1 is a block diagram showing a configuration of a common terminal device in accordance with the embodiment of the present invention. FIGS. 2, 4 and 6 are tables showing exemplary lists to be stored in the common terminal device in accordance with the embodiment of the present invention, while FIGS. 3, 5A, 5B and 7 are flowcharts showing operations to be performed in the common terminal device in accordance with the embodiment of the present invention. Further, FIGS. 8A through 8K are diagrams showing concrete examples of the operations performed by the common terminal device in accordance with the embodiment of the present invention.

The present embodiment relates to the system including one or more display sections to be configured to display the common working area that is operable by the plurality of users, and the following two modes may be considered as system operating modes. The first operating mode is such a mode in which a plurality of terminal devices, respectively operated by the users, are coupled to each other through a network. In the first operating mode, an operation performed on a screen (the common working area displayed on a display section) of any one of the terminal devices is reflected onto another screen (the common working area displayed on a display section) of another one of the terminal devices. The second operating mode is such a mode in which a single common terminal device is operated by the plurality of users. In the second mode, an operation performed by each of the users is reflected onto the screen (the common working area displayed on a display section) of the common terminal device. In the following, in order to make the explanations simple, the explanations will be given on the premise of the second operating mode.

A computer apparatus, a tablet terminal device, a display panel provided with an arithmetic calculating function, an electronic blackboard, etc. can be cited as the common terminal device in accordance with the embodiment of the present invention. As shown in FIG. 1, a common terminal device 101 includes a control section 102, a storage section 103, a display section 104, an operating section 105.

The control section 102 is constituted by a CPU (Central Processing Unit) and various kinds of storage devices, including a ROM (Read Only Memory), a RAM (Random Access Memory), etc., so as to control overall operations of the common terminal device 101. Further, the control section 102 also serves as a processing section 102*a* and an operator determining section 102*b*.

The processing section 102*a* acquires contents of operations performed by the operating section 105 so as to create a list (such as an operation history management list, an Undo/Redo operation management list and a repeating operation management list, which will be detailed later) being necessary to control the editing operations in regard to an Undo, a Redo, a Repetition, etc.

Further, the operator determining section 102*b* determines the operator who has performed operations on the common working area with the operating section 105. The method for determining the operator is such that, for instance, when the operator performs operations upon inputting a user ID (identification), the operator determining section 102*b* can determine the operator by using the user ID concerned. Further, in a case that each of the operators performs operations by employing a device having an inherent ID (for instance, RFID (Radio Frequency identification) tag), the operator determining section 102*b* can determine the operator by using the device ID, which is acquired by a reading device while referring to the correlating information stored in advance. Still further, in a case that the common terminal device 101 is provided with an image capturing device, such as a camera, the operator determining section 102*b* can determine the operator by using the image captured by the camera while referring to the correlating information stored in advance.

The processing section 102*a* and the operator determining section 102*b* may be configured as either hardware or software (for example, a program or instructions for controlling operations, being stored in a non-transitory computer-readable storage medium) that causes the control section 102 to perform functions as the processing section 102*a* and the operator determining section 102*b*.

The storage section 103 is constituted by various kinds of memory devices, an HDD (Hard Disc Drive), etc., to store the contents of the operations performed on the common working area by the operating section 105 and store lists such as the operation history management list, the Undo/Redo operation management list and the repeating operation management list.

The display section 104 is constituted by an LCD (Liquid Crystal Display), an organic EL (Electro Luminescence) display, etc., so as to display various kinds of objects including characters, figures, etc., in response to the operations, and serves as the common working area being operable by the plurality of users. Further, the operating section 105 is constituted by a touch panel in which electrodes are arranged in a lattice pattern onto the display section 104, hardware keys, etc., so as to instruct operations for creating, deleting, moving, enlarging or reducing, etc., in regard to an object, and further instruct editing operations of Undo, Redo, Repetition, etc. to be applied to the above operations which have been performed.

In this connection, although, according to the present embodiment, the common terminal device 101 is provided with the display section, it is also applicable that the results of the operations performed on the common terminal device 101 are reflected onto an external display device, without incorporating the display section in the common terminal device 101.

In the following, operation controls performed by employing the common terminal device 101 above-configured will be detailed. Initially, in order to perform editing operations by employing the operations which has previously performed, the operation history management list is created. FIG. 2 is a table showing an example of the operation history management list. The operation history management list is constituted by 6 information items, so as to make the operations performed on the common terminal device 101 manageable.

The information item of "OPERATION HISTORY NUMBER" represents an order of the operation performed, and increases its number by 1 at every time when a new operation is performed.

The information item of "OPERATOR ID" represents information for identifying the operator who actually performed the operation. The ID of the operator, which is determined by the operator determining section 102b at the time when the operation is performed, is set to the item.

The information item of "OBJECT ID" represents information for identifying the object serving as an operating object. The new "OBJECT ID" is set to the item at the time when a new object is created (refer to the column of "OPERATION HISTORY NUMBER" 1 through 3). While, at the time when the operation, other than the above, is performed, the ID of an existing object to be a target of the operation is set to the item (refer to the column of "OPERATION HISTORY NUMBER" 4).

The information item of "OPERATING CONTENTS" represents contents of the operation performed. For instance, the operation is described in such a manner that "CREATION (x, y)" represents the operation to create the object at the coordinate position (x, y), "DELETION" represents the deleting operation, "MOVEMENT(x, y)" represents the operation to move the object to the coordinate position (x, y), and "ENLARGEMENT (a)" represents the operation to enlarge the object (a) times. In this connection, the scope of the operation is not limited to above-mentioned operations of "CREATION", "DELETION", "MOVEMENT" and "ENLARGEMENT", but any kinds of operations performable for the object may be applicable in the present invention.

The information item of "VALIDITY OF OPERATION" represents whether the current status of the concerned operation is valid (1) or invalid (0). In a case that the operation is registered into the operation history management list after the operation has been performed, "VALIDITY OF OPERATION" is set at valid (1). After that, when the "Undo" is applied to the concerned operation, "VALID/INVALID OF OPERATION" is rewritten to invalid (0). Then, when the "Redo" is applied to the concerned operation so as to again make it valid, "VALID/INVALID OF OPERATION" is rewritten again to valid (1).

The information item of "VALIDITY OF OBJECT" represents whether the current status of the concerned object is valid (1) or invalid (0). The display section 104 displays only objects, the above parameter of which is set at valid (1). Further, in a case where the editing operations of Undo, Redo, Repetition, etc., are performed by employing the operation histories, neglected is the operation history whose "VALIDITY OF OBJECT" parameter is set at invalid (0). When the object is created or redisplayed through the Undo or Redo operation, "VALIDITY OF OBJECT" is set at valid (1). At this time, all of the parameters in regard to the operations for the objects having the same object ID are set at valid (1). Further, when the object is deleted, the parameter is set at invalid (0). At this time, all of the parameters in regard to the operations for the objects having the same object ID, except the "Undo" operation to delete the object concerned and the "Redo" operation to create the object concerned, are set at invalid (0).

Figure 3:
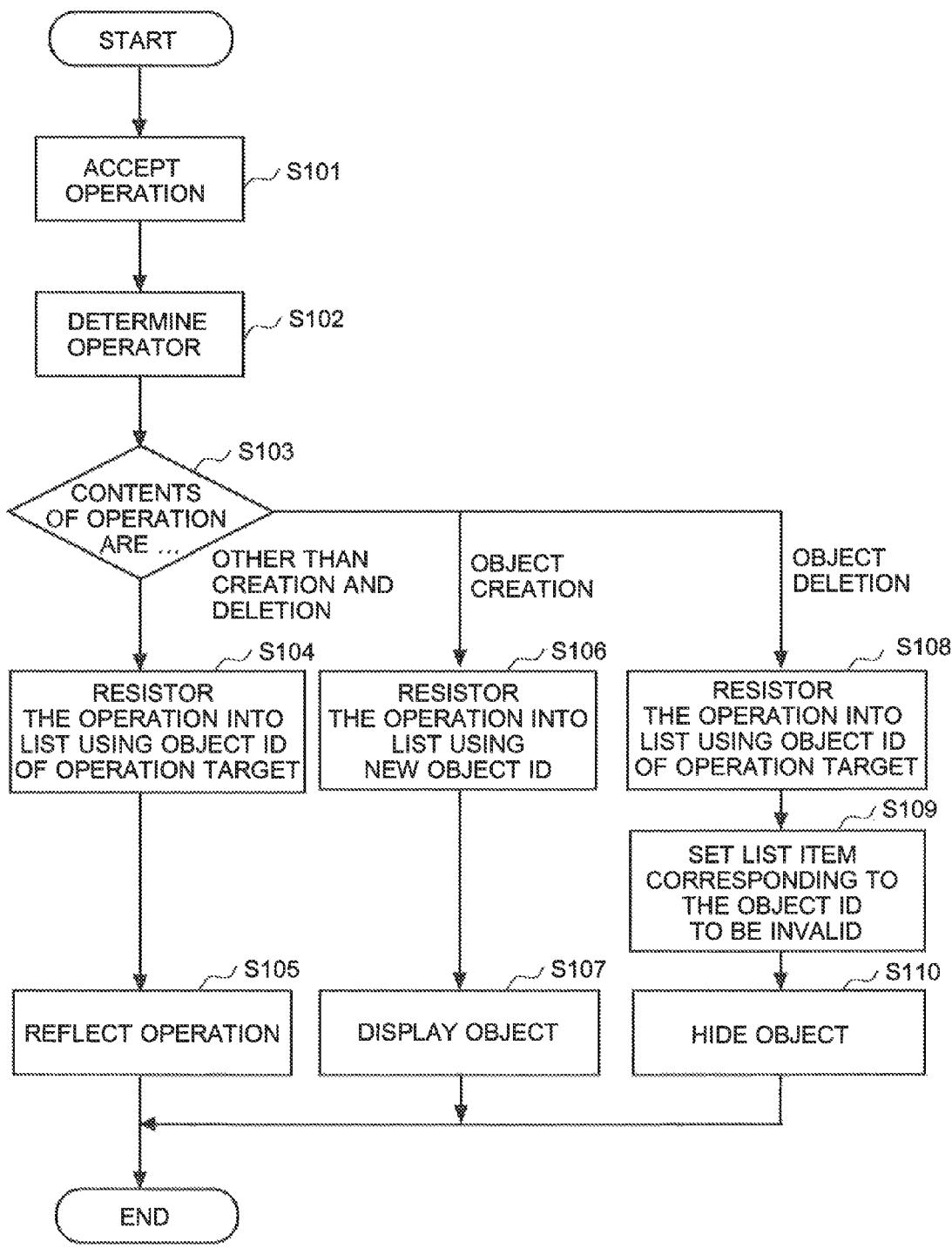
FIG. 3 is a flowchart showing a flow of processing for registering operations performed by a common terminal device, in accordance with an embodiment of the present invention, into an operation history management list.

Next, referring to the flowchart shown in FIG. 3, the procedure for registering the operations, performed on the common terminal device 101 in accordance with the embodiment of the present invention, will be detailed in the following.

At first, when the user performs an operation on the screen (the common working area displayed on the display section) through the operating section 105, the control section 102 (processing section 102a) accepts the operation (Step S101), so as to specify the contents of the operation and the object ID of the object as a target of the operation. Successively, the control section 102 (operator determining section 102b) determines the operator who actually performed the operation (Step S102). Concretely speaking, as aforementioned, in the case that the operator performed the operation by employing the device having the inherent ID (for instance, RFID (Radio Frequency Identification) tag), the operator is determined from the device ID concerned. Alternatively, in the case where the common terminal device 101 is provided with the camera, the operator is determined by referring the portrait image, captured by the camera, to that stored in advance. Still successively, the processing section 102a conducts the following processing depending on the contents of the operation (Step S103).

When determining that performed is the operation other than the "CREATION" or the "DELETION" (such as operations to move, enlarge and reduce the object), the processing section 102a registers the information of the operation into the operation history management list shown in FIG. 2 by employing the object ID for the currently operating object as an operation target (Step S104). Concretely speaking, the information items of "OPERATION HISTORY NUMBER", "OPERATOR ID", "OBJECT ID", "OPERATING CONTENTS", "VALIDITY OF OPERATION" and "VALIDITY OF OBJECT" are set at a number next to the currently-last number, the ID of the operator determined in Step S102, the ID of the object determined in Step S101, the contents of the operation specified in Step S101, "VALID" and "VALID", respectively. Then, the processing section 102a reflects the contents of the operation onto the object displayed on the display section 104 (Step S105).

On the other hand, when determining that that performed is the operation to create the object, the processing section 102a registers the information of the operation into the operation history management list, shown in FIG. 2, by employing a new object ID (Step S106). Concretely speaking, the information items of "OPERATION HISTORY NUMBER", "OPERATOR ID", "OBJECT ID", "OPERATING CONTENTS", "VALIDITY OF OPERATION" and "VALIDITY OF OBJECT" are set at a number next to the currently-last number, the ID of the operator determined in Step S102, the ID acquired by adding "1" to the largest ID among the IDs of the currently-existing objects, the contents of the operation specified in Step S101, "VALID" and "VALID", respectively. Then, the processing section 102a displays the created object onto the screen (Step S107).

Further, when determining that performed is the operation to delete the object, the processing section 102a registers the information of the operation into the operation history management list, shown in FIG. 2, by employing the object ID serving as the currently operating object as a operation target (Step S108), and sets the "VALIDITY OF OBJECT" at "INVALID", in regard to the operation history corresponding to the object being deleted at this time, on the operation history management list (Step S109). Then, the processing section 102a makes the corresponding object non-displayable (Step S110).

As described in the foregoing, after the information of the operation has been registered into the operation history management list as the history thereof, the processing section 102a accepts the operation of "Undo" or "Redo". Then, when the operation of "Undo" or "Redo" is commenced, the processing section 102a resisters the operation into the Undo/Redo operation management list, and after that, deletes the operation from the Undo/Redo operation management list at the time when the operation of "Undo" or "Redo" is completed. FIG. 4 is a table showing an example of the Undo/Redo operation management list. The Undo/Redo operation management list is constituted by the three information items shown in FIG. 4.

The information item of "OPERATOR ID" represents the ID of the operator who actually performs the operation of "Undo" or "Redo".

The information item of "OPERATION TARGET" represents the operation serving as the operation target of "Undo" or "Redo". In the present embodiment, since "Undo" or "Redo" is applied to the operation which has been performed by every operator separately from the other operators, the operator ID concerned is set in this column. In this connection, it is possible to establish a plurality of persons as the "OPERATION TARGET". For instance, in a case that the operations performed by both operator A and operator B are subjected to "Undo" or "Redo", the "OPERATION TARGET" is established as (A, B). Further, in a case that the overall operations are subjected to "Undo" or "Redo", the "OPERATION TARGET" is established as (A, B, . . . ) including all of the operator IDs.

The information item of "OPERATION RANGE" represents the objective range (time range) of the operations to be subjected to the "Undo" or "Redo". Herein, the "OPERATION RANGE" is established by using a range specified by the operation history numbers concerned. For instance, in a case that the "OPERATION RANGE" is established as (a, b), the operations to be subjected to the "Undo" or "Redo" reside in a range between the operation history numbers "a" and "b". The method for establishing the operation history numbers "a" and "b" will be detailed in the following.

The operation history number "a" represents a commencement time point of the operation to be subjected to the "Undo" or "Redo". Unless other "Undo" and/or "Redo" operations for the operation target (operator ID) are currently executed (unless residing in the Undo/Redo operation management list), the operation history number "a" is set at "1", since the overall range is made to be the objective range. When another "Undo" or "Redo" operation for the same operation target (operator ID) is currently executed, a new "OPERATION RANGE" is established at a range on and after the current "OPERATION RANGE" thereof. For instance, when the "Undo" is currently executed for operation target A residing within the operation range (1, 5), a new "OPERATION RANGE" is established at a range on and after "6". As described in the above, by setting the commencement time points of the "Undo" or "Redo" operations so as to make them shift from other currently-executed operations for the same object, it becomes possible to apply the plural "Undo" or "Redo" operations to the same operation target at a time.

The operation history number "b" represents a finalization time point of the operation to be subjected to the "Undo" or "Redo", and is established at the latest operation history number. According to the above, it becomes possible to make the operation just before instructing the "Undo" or "Redo" enter into the objective range.

Next, referring to the flowchart shown in FIGS. 5A and 5B, the operations to be conducted by the common terminal device 101 under the condition that the operator who registered operations into the operation history management list instructs the "Undo" or "Redo" for the operations, will be detailed in the following.

At first, the user operates the operating section 105 to designate the operation to be a target of the "Undo" (Step S201). According to the present embodiment, since it is possible to apply the "Undo" or "Redo" to the operation performed by every operator separately from others, the system accepts an operator designated by a user. Further, in this case, the operator concerned may be designated individually, the operators may be designated as a whole, or a plurality of operators may be designated.

Successively, the processing section 102a determines whether or not permission is given to the operator(s) to be a target of the "Undo" (Step S201). Concretely speaking, the processing section 102a extracts operators who are different from the operator who instructs the "Undo" operation, from the operators to be a target of the "Undo", and inquires of each of the extracted operators whether or not the "Undo" operation may be performed, so as to determine presence or absence of the permission of the extracted operators according to result of the inquiry. In this connection, it is also possible to establish in advance a combination of the operators to which the permission can be given, so that the processing section 102a determines presence or absence of the permission according to the establishment acquired thereby.

Still successively, when the permission for the operators to be a target of the "Undo" is acquired (including such a case that the operator who instructs the "Undo" operation and the operator to be a target of the "Undo" are the same as each other), the processing section 102a determines whether or not the operations (operators) to be a target of the "Undo" overlap with the other operation or operations (operator or operators) to be a target of the "Undo", which are currently executed, by referring to the Undo/Redo operation management list (Step S203). When determining that the operations (operators) to be a target of the "Undo" do not overlap with the other operation or operations (operator or operators), all of the range up to the present is established as the operation range (Step S204), while, when determining that the operations (operators) to be a target of the "Undo" overlap with the other operation or operations (operator or operators), the range on and after the operation range of the "Undo" operation(s), which is currently executed, is established as the operation range (Step S205). Then, the processing section 102a registers the "OPERATOR ID", the "OPERATION TARGET" and the "OPERATION RANGE" into the Undo/Redo operation management list (Step S206).

Still successively, the processing section 102a searches the operation history, corresponding to the "OPERATION TARGET" and the "OPERATION RANGE" registered into the Undo/Redo operation management list, from the operation history management list (Step S207). In case of the "Undo", the operation history to be searched is the latest and effective operation history within the "OPERATION TARGET" and the "OPERATION RANGE", while, in case of the "Redo", that is the oldest (operation history number is the smallest) and invalid operation history within the "OPERATION TARGET" and the "OPERATION RANGE".

Still successively, the processing section 102a turns the operation into valid or invalid state on the operation history management list (Step S208). Concretely speaking, in case of the "Undo", the status of "VALIDITY OF OPERATION" in the operation history management list is set at "INVALID", while, in case of the "Redo", the status of "VALIDITY OF OPERATION" in the operation history management list is set at "VALID". Then, depending on the contents of the operation, the processing section 102a conducts the processing described in the following (Step S209).

In a case that the operation to be a target of the "Undo" or "Redo" is other than the operation to create or delete the object (such as operations to move, enlarge and reduce the object), the processing section 102a turns the operation into valid or invalid (Step S210). Concretely speaking, in case of the "Undo", the operation is turned into invalid by applying an operation inverse of the current operation to the current state or by canceling the operation. In case of the "Redo", the operation is turned into valid by reflecting the operation onto the current state.

Further, in a case that the operation to be a target of the "Undo" or "Redo" is to create an object (in a case of "Undo" the deleting operation or "Redo" the creating operation), the processing section 102a turns the object into the valid status on the operation history management list (Step S211). Concretely speaking, the processing section 102a searches the operation histories having the same object IDs as those of the operations to be turned into the valid status at this time, so as to set all the statuses of "VALIDITY OF OBJECT" of them at "VALID". Then, the processing section 102a creates and displays the object (Step S212). On that occasion, with respect to the other operation histories for which the statuses of "VALIDITY OF OBJECT" in regard to the created object is set at "VALID", the above-mentioned operation is made to reflect on them at the same time.

Still further, in a case that the operation to be a target of the "Undo" or "Redo" is to delete an object (in a case of "Undo" the creating operation or "Redo" the deleting operation), the processing section 102a turns the object into the invalid status on the operation history management list (Step S213). Concretely speaking, the processing section 102a searches the operation histories having the same object IDs as those of the operations to be turned into the invalid status at this time, so as to set all the statuses of "VALIDITY OF OBJECT" of them at "INVALID", except "Undo" of the operation to delete the object concerned and "Redo" of the operation to create the object concerned. Then, the processing section 102a deletes the object and makes the deleted object non-displayable (Step S214).

Yet successively, the processing section 102a determines whether the implementation of the operation should be "CONTINUED" or "FINALIZED" (Step S215). This determination may be made either by confirming with the user or automatically. For instance, when the "Undo" or "Redo" operations are continuously implemented, the processing section 102a determines as "CONTINUED" and bans an editing operation to be conducted by another operator. Then, at the time when the operation other than the "Undo" or "Redo" operation is implemented, the processing section 102a determines as "FINALIZED". When determining as "CONTINUED", the processing section 102a inputs the operation of the "Undo" or "Redo" (Step S216) and makes the processing return to Step S207. When determining as "FINALIZED", the processing section 102a deletes the operation from the Undo/Redo operation management list and finalizes the processing (Step S217).

Although described in the foregoing is such a case that the "Undo" or "Redo" is applied to the operation history, it is also possible to repeat the operation in regard to the operation history. In this case, the operation is registered into the repeating operation management list at the time when the repeating operation is commenced, and then, deleted from the repeating operation management list at the time when the repeating operation is finalized. Alternatively, the concerned content in the repeating operation management list will be rewritten at the time when the repeating operation is commenced again. FIG. 6 is a table showing an example of the repeating operation management list, which is constituted by two information items shown in FIG. 6.

The information item of "OPERATOR ID" establishes an ID for specifying an operator who implements the repeating operation. The information item of "OPERATION TARGET" establishes the operation to be a target of the repeating operation by using the operation history number thereof.

Figure 7:
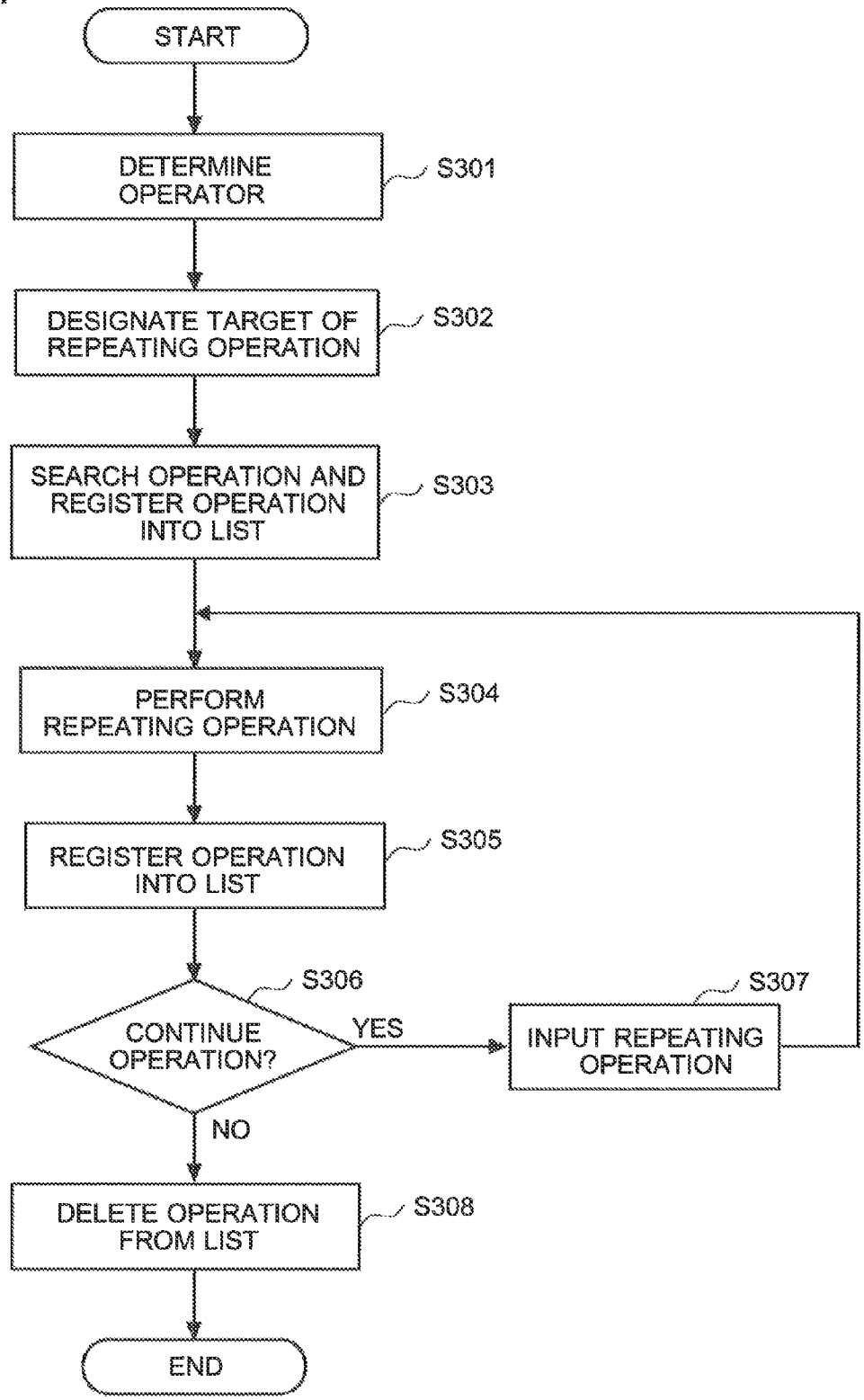
FIG. 7 is a flowchart showing a flow of processing to be conducted by a common terminal device in accordance with an embodiment of the present invention, when a repeating operation is performed.

Referring to the flowchart shown in FIG. 7, the operations to be conducted by the common terminal device 101 when performing the repeating operation will be detailed in the following.

At first, the operator determining section 102b determines the operator who has instructed the repeating operation to acquire the ID thereof (Step S301). Successively, the operator who has instructed the repeating operation designates the operation to be a target of the repeating operation (Step S302). According to the present embodiment, since it is possible to repeat the operation for every operator, the system accepts an operator designated by a user. Further, in this case, the operator concerned may be designated individually, the operators may be designated as a whole, or a plurality of operators may be designated.

Still successively, the processing section 102a searches the operation to be a target of the repeating operation from the operation history management list, and registers the operation, above-retrieved, into the repeating operation management list (Step S303). Concretely speaking, the processing section 102a searches the latest operation history of the target (searches such the operation history that has the largest number of operation history among the operation histories, the operations of which are effective within the objective range), and then, registers the number of the operation history above-retrieved into the column of "OPERATION TARGET" corresponding to the operator designated by the repeating operation management list. As described in the above, by employing the operation history number to set the target of the repeating operation, it becomes possible to repeat the same operation.

Still successively, the processing section 102a performs the repeating operation (Step S304). Concretely speaking, the processing section 102a specifies the operation corresponding to the operation history number concerned, and then, implements the operation. On that occasion, if it is necessary to designate the object, the processing section 102a makes the operator designate the object concerned. Still successively, the processing section 102a registers the implemented operation into the operation history management list according to the flowchart shown in FIG. 3 (Step S305). On that occasion, the operator is established as the operator who has implemented the repeating operation.

Yet successively, the processing section 102a determines whether the implementation of the repeating operation should be "CONTINUED" or "FINALIZED" (Step S306). This determination may be made either by confirming with the user or automatically. For instance, when the repeating operations are continuously implemented, the processing section 102a determines as "CONTINUED", and then, at the time when an editing operation other than the repeating operation is implemented, the processing section 102a determines as "FINALIZED". When determining as "CONTINUED", the processing section 102a inputs the repeating operation (Step S307) and makes the processing return to Step S304. When determining as "FINALIZED", the processing section 102a deletes the repeating operation from the repeating operation management list and finalizes the processing (Step S308). Alternatively, it is also applicable that, instead of deleting the repeating operation at this time, the repeating operation will be reestablished at the time when the repeating operation is commenced again.

Next, referring to FIG. 8A through FIG. 8K, such a case that the operation is registered as history, and then, the "Undo" operation is performed by using the operation history, will be concretely detailed in the following.

Initially, in a case that operator A inputs the object of "ROLLER COASTER" into a space corresponding to the "AMUSEMENT ATTRACTION" displayed within the common working area as shown in FIG. 8A, a new item having the "OPERATION HISTORY NUMBER" of "2" is added to the operation history management list shown in FIG. 8B. Further, in a case that operator B inputs the object of "HAUNTED MANSION" into a space corresponding to the "AMUSEMENT ATTRACTION" displayed within the common working area as shown in FIG. 8C, a new item having the "OPERATION HISTORY NUMBER" of "3" is added to the operation history management list shown in FIG. 8D.

Then, when the user operates the operating section 105 to select the "Undo" from the menu in the above-mentioned state, as shown in FIG. 8E, a list of operations (operators), which are the target of the "Undo", is displayed. In the above case, since the operator A and the operator B have performed the operations concerned, "OVERALL", "OPERATOR A" and "OPERATOR B" are displayed.

When the user selects the "OPERATOR A" as the target of "Undo" in the list above-mentioned, the "Undo" operation is registered into the Undo operation management list as shown in FIG. 8G in such a manner that the "OPERATOR ID" is set at "A", the "OPERATION TARGET" is set at "A." and the "OPERATION RANGE" is set at "1, 3", and further, the "VALIDITY OF OPERATION", corresponding to the "OPERATION HISTORY NUMBER" of "2" in the operation history management list shown in FIG. 8H, is set at "INVALID", and still further, the "VALIDITY OF OBJECT" is also set at "INVALID" and the object of the "ROLLER COASTER" is deleted from the displayed screen as shown in FIG. 8F.

Further, when the "OVERALL" is selected as the target of "Undo", the "Undo" operation is registered into the Undo operation management list shown in FIG. 8J in such a manner that the "OPERATOR ID" is set at "A", the "OPERATION TARGET" is set at "A, B" and the "OPERATION RANGE" is set at "1, 3", and further, the "VALID/INVALID OF OPERATION", corresponding to the "OPERATION HISTORY NUMBER" of "3" serving as the final operation in the operation history management list shown in FIG. 8K, is set at "INVALID", and still further, the "VALIDITY OF OBJECT" is also set at "INVALID" and the object of the "HAUNTED MANSION" finally filled is deleted from the displayed screen as shown FIG. 8I.

As described in the foregoing, according to present embodiment, when the operator performs an operation onto the common terminal device 101, the content of the operation are stored therein while being correlated to the operator concerned. Then, when an implementation of the editing operation, such as "Undo", "Redo", "Repetition", etc., is instructed by designating the operator, the editing operation is implemented only for the operation correlated to the operator designated. Therefore, no matter how editing points are complicated, it becomes possible to easily establish a desired editing condition.

In this connection, the present invention is not limited to the aforementioned embodiment. The configurations and controlling operations to be implemented in the present embodiment can be varied by a skilled person without departing from the spirit and scope of the present invention.

For instance, although the aforementioned embodiment indicates such a case that a single set of common terminal device 101 is employed for implementing a corporative working (such as operations on the common working area), the controlling operations embodied in the present invention is also applicable to such a case that a plurality of personal terminal devices are employed for implementing the corporative working (such as operations on the common working area), as well. In this case, the operation history management list, the Undo/Redo operation management list and the repeating operation management list may be commonly owned by the plurality of personal terminal devices, and, when one of the lists is edited by any one of the personal terminal devices, the concerned personal terminal device may notify the other personal terminal devices of the edited contents of the list concerned.

The invention claimed is:

1. A method of controlling operations performed on a common working area in a system, the system comprising one or more display sections being configured to display the common working area so as to allow a plurality of operators to perform operations on the common working area, the method comprising:

determining an operator in response to an operation performed by the operator on the common working area displayed in the one or more display sections;

storing an operation history in a storage section with the operation and the operator being associated with the operation history;

accepting one or more designated operators to be used for searching a desired operation history from among operation histories in the storage section, before performing an editing operation using the desired operation history; and performing the editing operation using one or more extracted operation histories as the desired operation history, the one or more extracted operation histories being obtained by extracting one or more operation histories being associated with the one or more designated operators from among the operation histories in the storage section;

wherein the editing operation includes a first operation to undo an operation which has ever been performed; and wherein the storing the operation history includes storing an operation history into the storage section with the operation, the operator and an object to be a target of the operation being associated with the operation history, and the performing the editing operation includes, under a condition that the editing operation causes a deletion of an object, setting operation histories being associated with the object among the one or more extracted operation histories, to be invalid so as not to be performed, where the operation histories associated with the object excludes an operation history of an operation to undo the deletion of the object and an operation history of an operation to redo a creation of the object.

2. The method of claim 1, wherein the accepting the one or more designated operators includes accepting overall the operators or a part of the operators selectably as the one or more designated operators.

3. The method of claim 1, wherein the editing operation includes a second operation to redo an operation which has been undone by the first operation.

4. The method of claim 1, wherein the performing the editing operation includes determining, in response to accepting the one or more designated operators including a predetermined operator, whether the predetermined operator gives an operator instructing the editing operation a permission to perform the editing operation or not, the predetermined operator being different from the operator instructing the editing operation, and performing the editing operation in response to a receipt of the permission of the predetermined operator.

5. The method of claim 1,
wherein the performing the editing operation includes
registering a time range to be used for the extracting the one or more operation histories,
determining, in response to a detection of one or more editing operations, whether an operator or operators corresponding to the one or more editing operations overlap with the one or more designated operators, and
extracting one or more operation histories performed in a time range later than a time range registered for the one or more editing operations, in response to a determination that the operator or operators corresponding to the one or more editing operations overlap with the one or more designated operators.

6. The method of claim 1, the performing the editing operation includes, under a condition that the editing operation causes a creation of the object again, setting the operation histories being associated with the object among the one or more extracted operation histories, to be valid so as to be performed, where the operation histories associated with the object excludes an operation history of an operation to undo the deletion of the object and an operation history of an operation to redo a creation of the object.

7. The method of claim 1, wherein the editing operation includes a third operation to repeat an operation which has ever been performed.

8. The method of claim 7, wherein the storing the operation history includes giving an operation-history number to the operation to be stored in the storage section, and the performing the editing operation includes registering an operation-history number of an operation to be repeated, and repeating an operation corresponding to the operation-history number registered by one of the operators separately from the other operators.

9. A non-transitory computer-readable storage medium storing instructions for controlling operations performed on a common working area in a system, the system comprising one or more display sections being configured to display the common working area so as to allow a plurality of operators to perform operations on the common working area, the instructions, when executed by a processor in the system, causing the processor to perform processes including:

determining an operator in response to an operation performed by the operator on the common working area displayed in the one or more display sections;

storing an operation history in a storage section with the operation and the operator being associated with the operation history; accepting one or more designated operators to be used for searching a desired operation history from among operation histories in the storage section, before performing an editing operation using the desired operation history; and performing the editing operation using one or more extracted operation histories as the desired operation history, the one or more extracted operation histories being obtained by extracting one or more operation histories being associated with the one or more designated operators from among the operation histories in the storage section;

wherein the editing operation includes a first operation to undo an operation which has ever been performed; and wherein the storing the operation history includes storing an operation history into the storage section with the operation, the operator and an object to be a target of the operation being associated with the operation history, and the performing the editing operation includes, under a condition that the editing operation causes a deletion of an object, setting operation histories being associated with the object among the one or more extracted operation histories, to be invalid so as not to be performed, where the operation histories associated with the object excludes an operation history of an operation to undo the deletion of the object and an operation history of an operation to redo a creation of the object.

10. The non-transitory computer-readable storage medium of claim 9, wherein the accepting the one or more designated operators includes accepting overall the operators or a part of the operators selectably as the one or more designated operators.

11. The non-transitory computer-readable storage medium of claim 9, wherein the editing operation includes a second operation to redo an operation which has been undone by the first operation.

12. The non-transitory computer-readable storage medium of claim 9, wherein the performing the editing operation includes determining, in response to accepting the one or more designated operators including a predetermined operator, whether the predetermined operator gives an operator instructing the editing operation a permission to perform the editing operation or not, the predetermined operator being different from the operator instructing the editing operation, and performing the editing operation in response to a receipt of the permission of the predetermined operator.

13. The non-transitory computer-readable storage medium of claim 9,
wherein the performing the editing operation includes
registering a time range to be used for the extracting the one or more operation histories,
determining, in response to a detection of one or more editing operations, whether an operator or operators corresponding to the one or more editing operations overlap with the one or more designated operators, and
extracting one or more operation histories performed in a time range later than a time range registered for the one or more editing operations, in response to a determination that the operator or operators corresponding to the one or more editing operations overlap with the one or more designated operators.

14. The non-transitory computer-readable storage medium of claim 9, the performing the editing operation includes, under a condition that the editing operation causes a creation of the object again, setting the operation histories being associated with the object among the one or more extracted operation histories, to be valid so as to be performed, where the operation histories associated with the object excludes an operation history of an operation to undo the deletion of the object and an operation history of an operation to redo a creation of the object.

15. The non-transitory computer-readable storage medium of claim 9, wherein the editing operation includes a third operation to repeat an operation which has ever been performed.

16. The non-transitory computer-readable storage medium of claim 15, wherein the storing the operation history includes giving an operation-history number to the operation to be stored in the storage section, and the performing the editing operation includes registering an operation history number of an operation to be repeated, and repeating an operation corresponding to the operation-history number registered by one of the operators separately from the other operators.

17. An operation controlling apparatus for controlling operations performed on a common working area in a system, the system comprising one or more display sections being configured to display the common working area so as to allow a plurality of operators to perform operations on the common working area, the operation controlling apparatus comprising:
a storage section for storing operation histories; an operating section configured to allow the operators to perform operations on the common working area;
an operator determining section configured to determine an operator in response to an operation performed by the operator on the common working area displayed in the one or more display sections; and
a processing section configured to store an operation history in a storage section with the operation and the operator being associated with the operation history, accept one or more designated operators to be used for searching a desired operation history from among operation histories in the storage section, before performing an editing operation using the desired operation history, and perform the editing operation using one or more extracted operation histories as the desired operation history, the one or more extracted operation histories being obtained by extracting one or more operation histories being associated with the one or more designated operators from among the operation histories in the storage section;
wherein the editing operation includes a first operation to undo an operation which has ever been performed; and
wherein the processing section is configured to store an operation history into the storage section with the operation, the operator and an object to be a target of the operation being associated with the operation history, and
under a condition that the editing operation causes a deletion of an object, set operation histories being associated with the object among the one or more extracted operation histories, to be invalid so as not to be performed, where the operation histories associated with the object excludes an operation history of an operation to undo the deletion of the object and an operation history of an operation to redo a creation of the object.

18. The operation controlling apparatus of claim 17, wherein the processing section is configured to accept overall the operators or a part of the operators selectably as the one or more designated operators.

19. The operation controlling apparatus of claim 17, wherein the editing operation includes a second operation to redo an operation which has been undone by the first operation.

20. The operation controlling apparatus of claim 17, wherein the processing section is configured to determine, in response to accepting the one or more designated operators including a predetermined operator, whether the predetermined operator gives an operator instructing the editing operation a permission to perform the editing operation or not, the predetermined operator being different from the operator instructing the editing operation, and perform the editing operation in response to a receipt of the permission of the predetermined operator.

21. The operation controlling apparatus of claim 17,
wherein the processing section is configured to
register a time range to be used for the extracting the one or more operation histories,
determine, in response to a detection of one or more editing operations, whether an operator or operators corresponding to the one or more editing operations overlap with the one or more designated operators, and
extract one or more operation histories performed in a time range later than a time range registered for the one or more editing operations, in response to a determination that the operator or operators corresponding to the one or more editing operations overlap with the one or more designated operators.

22. The operation controlling apparatus of claim 17, wherein the processing section is configured to under a condition that the editing operation causes a creation of the object again, set the operation histories being associated with the object among the one or more extracted operation histories, to be valid so as to be performed, where the operation histories associated with the object excludes an operation history of an operation to undo the deletion of the object and an operation history of an operation to redo a creation of the object.

23. The operation controlling apparatus of claim 17, wherein the editing operation includes a third operation to repeat an operation which has ever been performed.

24. The operation controlling apparatus of claim 23, wherein the processing section is configured to give an operation-history number to the operation to be stored in the storage section, register an operation-history number of an operation to be repeated, and repeat an operation corresponding to the operation-history number registered by one of the operators separately from the other operators.

25. The operation controlling apparatus of claim 17, further comprising a display section configured to display the common working area.

26. A non-transitory computer-readable storage medium storing instructions for controlling operations performed on a common working area in a system, the system comprising one or more display sections being configured to display the common working area so as to allow a plurality of operators to perform operations on the common working area, the instructions, when executed by a processor in the system, causing the processor to perform processes including:

determining an operator in response to an operation performed by the operator on the common working area displayed in the one or more display sections;

storing an operation history in a storage section with the operation, the operator and an object to be a target of the operation being associated with the operation history;

accepting one or more designated operators to be used for searching a desired operation history from among operation histories in the storage section, before performing an editing operation which uses the desired operation history and includes a first operation to affect an operation which has ever been performed;

performing the editing operation using one or more extracted operation histories as the desired operation history, the one or more extracted operation histories being obtained by extracting one or more operation histories being associated with the one or more designated operators from among the operation histories in the storage section, and wherein the performing the editing operation includes, under a condition that the editing operation causes a deletion of the object which has ever been performed, setting operation histories being associated with the object among the one or more extracted operation histories, to be invalid so as not to be performed, where the operation histories associated with the object excludes an operation history of an operation to undo the deletion of the object and an operation history of an operation to redo a creation of the object.

* * * * *